DIVIDING CIRCUIT USING MONOSTABLE MULTIVIBRATOR

Filed Oct. 27, 1970

United States Patent Office 3,705,991

Patented Dec. 12, 1972

3,705,991
DIVIDING CIRCUIT USING MONOSTABLE MULTIVIBRATOR

Nobuhito Hobo, Inuyama, Japan, assignor to Nippondenso Kabushiki Kaisha, Aichi-ken, Japan Filed Oct. 27, 1970, Ser. No. 84,370
Claims priority, application Japan, Dec. 8, 1969, 44/98,537
Int. Cl. H03k 3/10; G06g 7/16
U.S. Cl. 307—273 3 Claims

ABSTRACT OF THE DISCLOSURE

A dividing circuit comprising a monostable multivibrator with an RC type time-constant-determining circuitry, and a constant D.C. voltage source and two variable D.C. voltage sources. In a stable state, the time-constant-determining capacitance is charged from a first variable D.C. voltage source corresponding to a numerator, and in unstable state it discharges through a loop including a second variable D.C. voltage source corresponding to a denominator.

RELATED APPLICATION

This application is related to the Hobo et al. application, Ser. No. 37,185, filed May 14, 1970, which employs the circuit of the present application.

BACKGROUND OF THE INVENTION

Field of the invention

This invention relates to a dividing circuit, and more particularly to a dividing circuit of analog type comprising a resistance-capacitance (RC) coupling type monostable multivibrator which provides an output pulse having a time width according to the quotient of operands given in voltage form.

Description of the prior art

A conventional monostable multivibrator is schematically shown in FIG. 1 and comprises transistors 2 and 3, collector load resistors 4 and 5 connected to said transistors 2 and 3 respectively, a time constant determining circuit including a resistor 6 and a capacitor 7, resistors 8 and 9, and a trigger circuit 10 including a diode 11, a capacitor 12, and a resistor 16. The circuit is supplied with a D.C. potential from a constant D.C. voltage source 13. In this monostable multivibrator circuit, normally or in stable state, the transistor 2 is cut off and the transistor 3 is turned on. When a trigger signal is supplied to a trigger input point *a* under such normal state, the transistor 2 is turned on and the transistor 3 is turned off to rapidly shift the ciruit into unstable state. After keeping this unstable state for a constant period, the transistor 2 is turned off and the transistor 3 is turned on to shift the circuit into the stable state again. Thus, a voltage pulse of positive polarity having a time width equal to the period of said unstable state, i.e. a timer pulse, is provided from the collector of the transistor 3, i.e. point *b*.

The width of the timer pulse of said conventional circuit is determined by the time constant formed of the product of the resistance 6 and the capacitance 7 of the time-constant-determining circuitry. That is, the unstable period of a conventional circuit, in which connection point *c* of the collector load resistor 4 for a normally cut off transistor 2 and connection point *d* of the resistor 6 of a time-constant-determining circuitry are both connected to a D.C. source 13 of a constant voltage, i.e. the timer pulse width T (sec), can be expressed as $$T=CR\ \ln\frac{2V_B-V_{CE}-V_{BE}}{V_B-V_{BE}}\ (\text{sec}) \qquad (1)$$

where

C: magnitude of the time-constant-determining capacitor 7 (F),

R: magnitude of the time-constant determining resistor 6 (Ω), $V_B$: voltage of the D.C. voltage source 13 (V), $V_{BE}$: forward terminal voltage between the base and the emitter of the transistor 3 (V), and $V_{CE}$: saturation voltage between the collector and the emitter of the transistor 2(V).

Since the values $V_{BE}$ and $V_{CE}$ are small (<1 V) for both germanium and silicon transistors, relations $V_B \gg V_{BE}$ and $V_B \gg V_{CE}$ usually hold. Thus, the above Equation 1 can be approximated as $$T \doteqdot CR\ \ln 2 \doteqdot 0.7CR\ (\text{sec}) \qquad (2)$$

Thus, in approximation the width T of the timer pulse is not related with the source voltage $V_B$ and solely determined by the product CR of the time-constant-determining resistor 6 and capacitor 7. Therefore, it is apparent that such a conventional multivibrator cannot be directly used as a dividing circuit capable of providing a quotient in accordance with variable inputs.

SUMMARY OF THE INVENTION

This invention provides a dividing circuit comprising a resistance-capacitance coupling type monostable multivibrator having the connection point of a collector load resistor of a normally cut-off transistor connected to a voltage source which supplies a numerator or an operand to be divided, and the connection point of a time-constant-determining resistor connected to a voltage source which supplies a denominator or an operand to divide with, thereby generating a timer pulse the width of which corresponds to the quotient of said operands.

According to this invention, the quotient of an operand (numerator) divided by another operand (denominator) both given in the form of voltage can be provided as a timer pulse width by a simple circuit structure comprising two transistors, and further said timer pulse can be synchronized with the trigger pulse.

DESCRIPTION OF THE PREFERRED EMBODIMENT

Figure 1:
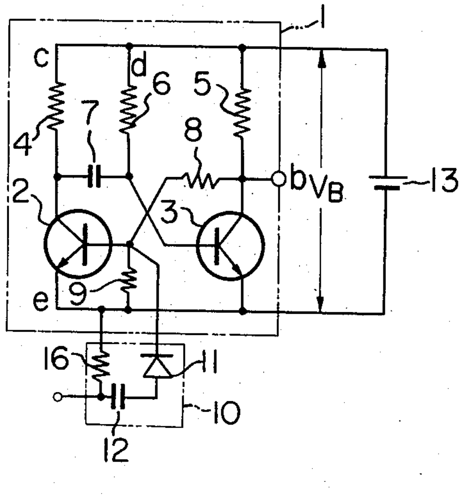
FIG. 1 PRIOR ART
FIG. 1 shows an electrical network of a conventional monostable multivibrator.
Figure 2:
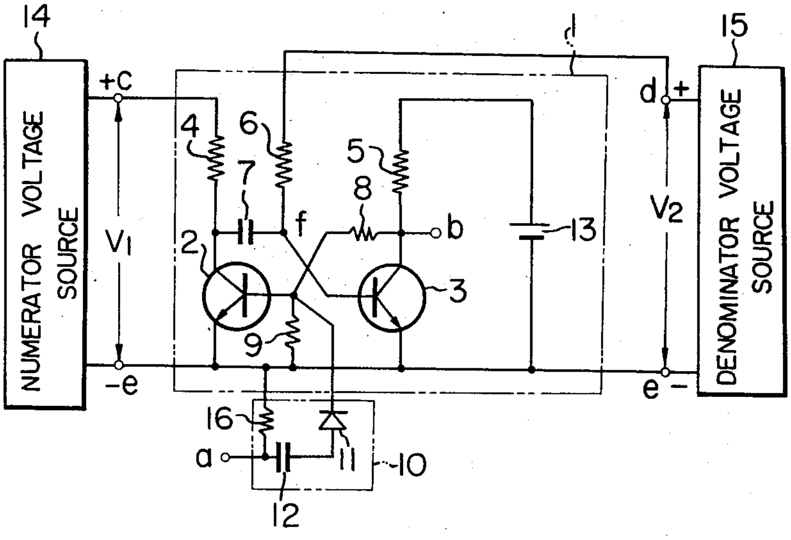
FIG. 2 shows an electrical network of an embodiment of dividing circuit using a monostable multivibrator according to the invention.

FIG. 2 shows an embodiment of RC coupling type monostable multivibrator in which the circuit 1 comprises two transistors 2 and 3, collector load resistors 4 and 5 connected to said transistors respectively, a time-constant-determining circuit including a resistor 6 and a capacitor 7, voltage dividing resistors 8 and 9 connected to the base of the normally cut-off transistor 2 at the interconnection point, and a trigger circuit 10 including a diode 11, a capacitor 12 and a resistor 16. The normally turned-on transistor 3 is supplied with a D.C. voltage from a constant voltage source 13 through the collector load resistor 5, and the normally cut-off transistor 2 is supplied with a D.C. voltage from a variable voltage source 14 for supplying a numerator through connection point *c* and the collector load resistor 4. A denominator in the form of voltage is given by a variable D.C. voltage source 15 through connection point *d* of the time-constant-determining resistor 6. Letter *e* denotes a common grounded point.

The operation of the dividing circuit described above and shown in FIG. 2 is as follows. In the stable state with no trigger signal applied to the trigger input point *a*, the transistor 2 is cut off and the transistor 3 is turned on. The charging circuit for the capacitor 7 is formed of a loop including the numerator voltage source 14 point *c*, the collector load resistor 4, the capacitor 7, the base and emitter of the transistor 3, and opint *e*. Thus the charging voltage of the capacitor 7 is approximately $V_1-V_{BE}$, where $V_1$ is the numerator voltage given by the terminal voltage of the source 14 and $V_{BE}$ is the base-emitter forward saturation voltage of the transistor 3.

When a trigger signal is supplied to the trigger input point *a* to trigger the transistor 2 into the conducting state, the transistor 3 is turned off to shift the circuit into unstable state. Then, the discharging circuit of the capacitor 7 is formed of a loop including the denominator voltage source 15, point *d*, the time-constant-determining resistor 6, the capacitor 7, the collector-emitter of the transistor 2 and point *e*. Taking a reference in time at the instance when the circuit is changed from the stable state to the unstable state, the voltage $v(t)$ at a time *t* and point *f* with respect to that at point *e*, i.e. the voltage difference between the capacitor 7 and the base of the transistor 3, can be expressed as $$v(t)=-(V_1+V_2-V_{BE}-V_{CE}\exp[-t/CR]+(V_2-V_{CE}) \quad (3)$$

where, $V_2$ is the denominator voltage given by the voltage source 15 and $V_{CE}$ is the collector-emitter saturation voltage of the transistor 2. The unstable state continues till the base potential $v(t)$ of the transistor 3, i.e. the potential difference between points *f* and *e* reaches the forward bias voltage of the transistor 3, $V_{BE}$. Therefore, the period of the unstable state, i.e. the timer pulse width, T can be given from Equation 3 by setting $v(T)=V_{BE}$;

$$T\doteqdot CR\ln\left(1+\frac{V_1-V_{CE}}{V_2-V_{BE}}\right)\text{ (sec)} \quad (4)$$

In such a region where $V_1$ and $V_2$ are considerably large relative to $V_{CE}$ and $V_{BE}$, $V_{CE}$ and $V_{BE}$ can be omitted and Equation 4 becomes $$T\doteqdot CR\ln\left(1+\frac{V_1}{V_2}\right) \quad (5)$$

Further, in the region of $V_2 << V_1$, Equation 5 becomes $$T=CR\ 1n\ (V_1/V_2) \quad (6)$$

Thus, the width T of a timer pulse at output point *b* corresponds to the quotient or the result of a dividing operation in which the numerator $V_1$ is divided by the denominator $V_2$. The transformation coefficient from the quotient to the pulse width T is CR. A dividing operation is done each time a trigger signal is applied to the trigger input point *a*, and thereby a timer pulse width corresponding to the dividing operation is provided in synchronism with the trigger signal.

I claim:

1. A dividing circuit using a monostable multivibrator comprising:

means for producing a first variable control voltage representing a numerator, means totally independent of said first control voltage producing means for producing a second variable control voltage repesenting a denominator, means for producing a trigger signal, a monostable multivibrator type timer circuit having a normally stable state and an unstable state and having first, second and third input terminals respectively connected to said producing means for respectively receiving said first and second variable control voltages and said trigger signal, said timer circuit being triggered from said stable state to said unstable state by said trigger signal and having only first and second transistors which are connected to said three terminals, said second transistor being normally conductive while said timer circuit is in said stable state, each of said transistors having respective collector, emitter and base electrodes with the emitter electrodes being connected together, said collector electrodes of each transistor being cross coupled to the base electrode of the other transistor, a D.C. voltage source for energizing said second transistor, said source being totally independent of said first and second control voltage producing means, means including a first resistor connected to said D.C. source and being in the said cross coupling of the collector electrode of said second transistor with the base of the first transistor for causing the first transistor to be conductive while said timer circuit is in said unstable state, a capacitor in the said cross coupling from said first transistor collector electrode to the second transistor base electrode and forming first and second junction points therewith respectively, a first path including said second transistor base and emitter electrodes and a second resistor connected only between said first input terminal and said first junction point for charging said capacitor by said first control voltage when said second transistor is conductive as aforesaid, there being between said second junction point and said second input terminal only a resistance having a resistance value which is independent of the value of said second control voltage and which forms with said capacitor and first transistor collector and emitter electrodes a second path for discharging said capacitor when said timer circuit is triggered to said unstable state to cause from said second transistor an output timing pulse having a time duration proportional to said first variable control voltage and inversely proportional to said second variable control voltage, said second transistor being rendered non-conductive during said discharging of said capacitor and being rendered conductive again when the said discharging has progressed sufficiently to cause a predetermined voltage at said second junction point so as to turn on said second transistor which is then maintained conductive by current flow to its base electrode from said second control voltage through said resistance, whereby the width of the output timing pulse corresponds to the operational result of the division of said numerator by said denominator.

2. The dividing circuit according to claim 1, in which said first and second control voltage producing means are respectively constituted by separate, individual variable D.C. voltage sources.

3. A dividing circuit using a monostable multivibrator capable of producing a time pulse the width of which can be varied comprising:

a first D.C. voltage source for variably generating a D.C. voltage corresponding in magnitude to a numerator, a second D.C. voltage source totally independent of said first source for variably generating a D.C. voltage corresponding in magnitude to a denominator, the value thereof being considerably lower than that of the voltage of said first D.C. voltage source, a resistor-capacitor coupled monostable timer circuit including only two transistors, one being a first normally non-conducting transistor and the other a second normally conducting transistor, each having an emitter electrode, a base electrode and a collector electrode, a potential source totally independent of said first and second sources and being connected through a first resistor to the collector electrode of said second transistor for supplying energy thereto, a first cross-coupling path including a capacitor connected between said collector electrode of said first transistor and said base electrode of said second transistor, a second cross-coupling path including a second resistor connected between the said base electrode of said first transistor and the collector of said second transistor, a third resistor connected between the base electrode of said first transistor and a common connection of the emitter electrodes of both said transistors, a fourth resistor connected between the collector electrode of said first transistor and said first D.C. voltage source, and a fifth resistor having one end connected to said first cross-coupling path at a point between said capacitor and second transistor base electrode, to form with said capacitor a discharging time-constant determining circuit for the timer circuit, the other end of said fifth resistor being connected directly to said second D.C. voltage source, and means for producing a trigger signal, being connected to the base electrode of said first transistor, whereby the capacitor of the time-constant determining circuit is charged by said first D.C. voltage through said normally conducting second transistor, but is discharged through said first transistor and the fifth resistor of said time-constant determining circuit to said second D.C. voltage source when said trigger signal renders said first transistor conductive, so that the width of a timing pulse resulting at the collector electrode of said second transistor is proportional to the division of said numerator by said denominator.

References Cited

UNITED STATES PATENTS

| | | | |
|---|---|---|---|
| 3,211,926 | 10/1965 | Frysinger | 307—273 |
| 3,213,297 | 10/1965 | Greene | 307—273 X |
| 3,260,864 | 7/1966 | Nourney | 307—273 |
| 3,346,746 | 10/1967 | Gordon | 307—273 |
| 3,461,321 | 8/1969 | Greene | 307—273 |
| 3,517,220 | 6/1970 | Gibson et al. | 307—273 |
| 3,454,754 | 7/1969 | Gassler et al. | 328—161 X |

STANLEY D. MILLER, Jr., Primary Examiner

U.S. Cl. X.R.

235—196; 307—265; 328—161, 207